June 6, 1933.  J. ROBINSON  1,913,060
AUTOMATIC TRAIN PIPE CONNECTER
Original Filed Aug. 22, 1929
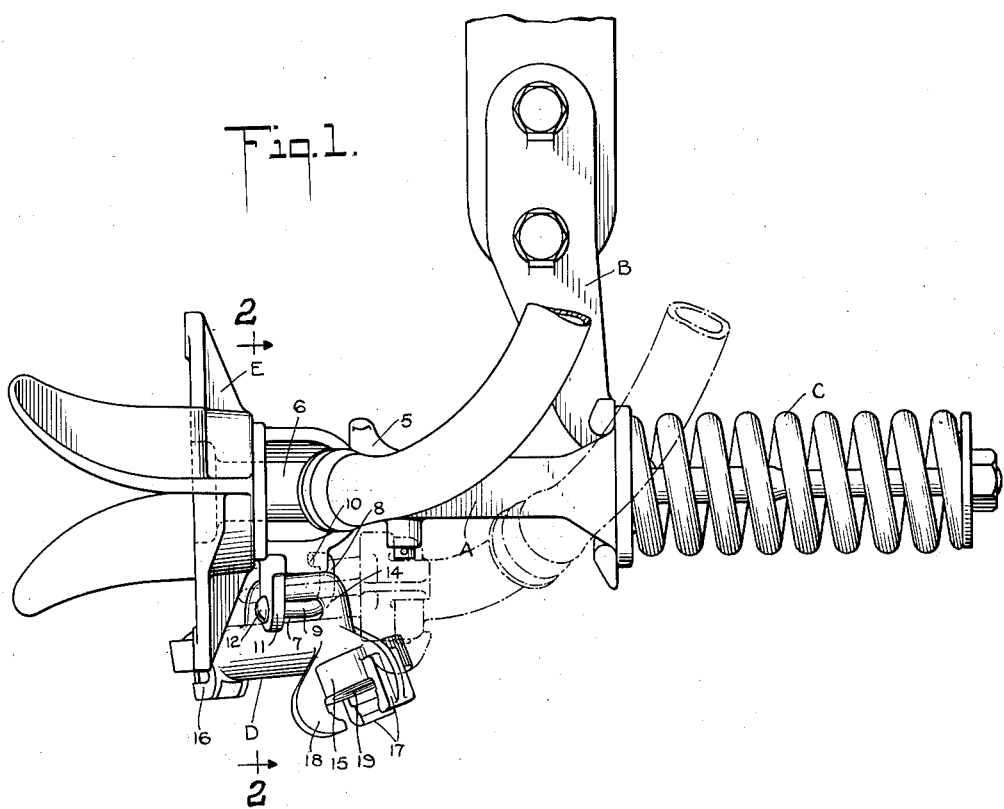
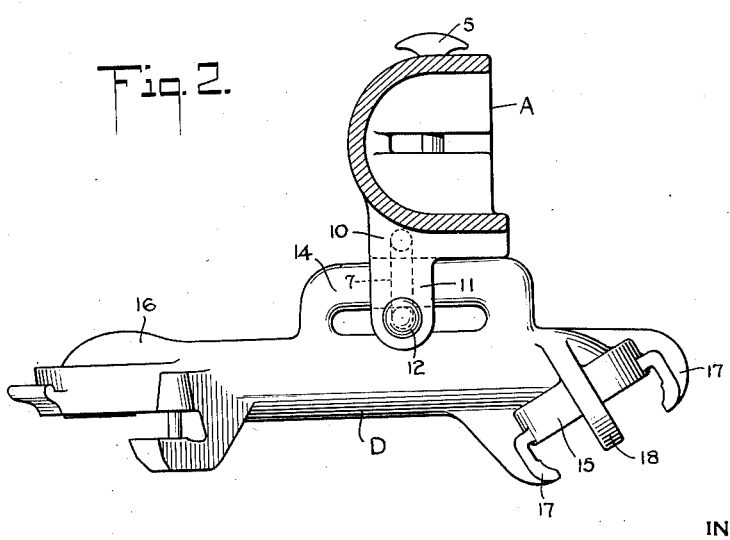
INVENTOR
Joseph Robinson
BY
Watson, Coit, Morse & Grindle
ATTORNEY Patented June 6, 1933

1,913,060

UNITED STATES PATENT OFFICE

JOSEPH ROBINSON, OF NEW YORK, N. Y.

AUTOMATIC TRAIN PIPE CONNECTER

Application filed August 22, 1929, Serial No. 387,762. Renewed October 27, 1932.

This invention relates to improvements in automatic train pipe connecters, and particularly to devices for interchangeably connecting such connecters to a car not equipped therewith. In my co-pending application Serial #342,686 filed February 26th, 1929 I show an efficient form of such interchange. One of the objects of the present invention is to improve that construction by so arranging it that upon disconnection of the car in interchange, the interchange device will be automatically protected against objectionable accumulation therein of foreign substances.

In the drawing Figure 1 is a side elevation of my improvement. In this view the interchange is shown in dotted lines in the service position. The usual connecter head is shown, and Figure 2 is a sectional front elevation on substantially the line 2—2 of Figure 1.

Referring to the drawing: any suitable type of coupling head may be used with my improvement, such for instance as the type of head shown in the aforesaid co-pending application. Any desired type of support for yieldingly sustaining the coupling head, and hence my improved interchange device, may also be employed. I illustrate a yoke or carrier A which embraces the bracket B, the yoke being yieldingly sustained on the bracket by a buffer spring C. The forward end of the yoke is hollow and in this hollow I removably mount, as by the plunger pin 5, a laterally curved conduit 6 which carries at its forward end an expansible gasket such as is illustrated in the aforesaid co-pending application. My improved interchange device D is hung from the bottom of the yoke by means of an anchor device or link 7. This link comprises a vertically extending portion 8 and a horizontal extending portion 9. The vertically extending portion is hooked into a socket or boss 10 on the yoke, and the horizontal portion projects through a vertically extending lug 11, formed on the yoke A, and is riveted therein as shown at 12—Figure 2. The horizontally disposed portion 9 of the link extends through an elongated opening formed in the lug 14 of my improved interchange D as illustrated. It will be noted that the upper wall of the opening in the lug 14 is in cross section curved to facilitate swinging the interchange device to the service position shown in dotted lines in Figure 1, and that the lug 14 engages the yoke A to prevent undue wear and excessive downward rotation of the interchange on the pin or link 7.

When the interchange D, which is of course hollow, is in the normal uncoupled position, shown in Figure 2, or in other words is not in use, the head 15 thereof faces downwardly. Likewise as to the customary hand hose coupling 16 which forms a part of my improved interchange. In other words, in such uncoupled position the mouths of the parts 15 and 16 will be disposed downwardly to such an extent that foreign matter will not enter or lodge therein. When it is desired to put a car into interchange engagement with the automatic connecter, the conduit 6 is removed from the yoke A, or the coupling head E, whereupon the interchange device is shifted or swung to the position shown in dotted lines in Figure 1, which brings the face of the head 15 and of the coupling 16 into substantially vertical planes, or in other words brings the axes of the mouths into a substantially horizontal position. The forward enlarged end of the conduit 6 is then passed downwardly between the dogs 17 and 18 of the interchange device, as illustrated in Figure 1, and more particularly in the aforesaid co-pending application. Upon disconnection of the parts, the interchange device D will automatically swing or fall by gravity to the position shown in Figure 2 where it is protected effectively against the accumulation therein of objectionable amounts of foreign substances, such for instance as snow and ice. It will be noted that my improved interchange comprises a single piece or part. It may of course be made with the coupling head 16 a separate part, and the two suitably secured together. I am aware that other means for causing the interchange device to swing into the position of safety mentioned, or otherwise be protected against foreign substances accumulating therein, may be devised, but I have shown an efficient rugged construction and do not desire to be limited to the particular arrangement illustrated. The gasket 19 in the interchange is also of the expansible type.

What I claim is:

1. In an automatic train pipe connecter, a support for a connecter head, an interchange device carried by said support, said device having at each end a mouth normally disposed downwardly when said device is not in use, and means pivotally connecting said device to said support to permit the former to be turned into position with the axes of the mouths thereof disposed substantially horizontally.

2. In an automatic train pipe connecter, a support for a connecter head, an interchange device carried by said support, said device comprising a tubular member having at each end a mouth normally disposed downwardly when said device is out of use, and means intermediate the ends of said device for pivotally connecting it to said support, said means being arranged to permit said device to be moved into position with the axes of the mouths thereof disposed substantially horizontally.

3. In an automatic train pipe connecter, a support for a connecter head, an interchange device carried by said support, said device having a mouth and a face surrounding the same which are normally disposed downwardly when said device is not in use, means pivotally connecting said device to said support to permit the former to be turned into position with said face arranged in a substantially vertical plane and the axis of said mouth disposed substantially horizontally.

4. In an automatic train pipe connecter, a support for a connecter head, an interchange device carried by said support and movable relative thereto, said device having two mouths normally disposed downwardly when said device is not in use, to thereby prevent lodgment of foreign substances therein, said device being movable into a position with the axes of the mouths thereof disposed substantially horizontally.

5. In an automatic train pipe connecter, a support for a connecter head, a train pipe hose, an interchange device carried by said support and movable relative thereto, said device having two mouths disposed downwardly when said device is in normal uncoupled position and not in use, said device being movable into a position with the axes of the mouths thereof disposed substantially horizontally to permit coupling of said hose thereto, said device being movable automatically into said normal uncoupled position when disconnected from said hose.

6. An arrangement for connecting the hose of a car having an automatic train pipe connecter with the hose of a car having the ordinary hand hose coupling, said arrangement comprising, a support for an automatic train pipe connecter head, an interchange device carried by said support, said device having two mouths normally disposed downwardly when said device is not connected to said hose, means for pivotally connecting said device to said support whereby the same may be swung into a position with the axes of the mouths thereof disposed substantially horizontally and coupled to each of said hose.

7. In combination with an automatic connecter head and support therefor, a train pipe hose, an arrangement for connecting said hose to the hose of a car not equipped with an automatic connecter, said arrangement comprising a device carried by said support, means pivotally connecting said device to said support whereby the device may be swung laterally and upwardly, said device having at each end a mouth normally disposed downwardly when said device is in normal uncoupled position and not in use, the axes of said mouths being disposed substantially horizontally when said device is swung upwardly about its pivotal connection with said support to thereby permit connection of said hose to said device.

8. In an automatic train pipe connecter, in combination, a connecter head and a support therefor, an interchange device carried by said support and having a mouth at each end, said device being pivotally connected to said head and normally held by gravity with the mouths thereof disposed downwardly, said device being shiftable relative to said head into a position with the axes of said mouths disposed substantially horizontally.

9. In an automatic train pipe connecter, a support for a connecter head, an interchange device, said device having at each end a mouth to which train pipes may be connected, means for connecting the device to said support so that the same will normally move by gravity into a position where said mouths will be disposed downwardly and thereby prevent lodgment of foreign matter into the same, said connecting means being arranged to permit said device being turned upwardly so that the axes of the mouths thereof will be disposed substantially horizontally and in position to be readily connected to the train pipes.

10. In an automatic train pipe connecter, a support for a connecter head, an interchange device, said device having at each end a mouth to which a train pipe may be connected, means for connecting said device to said support so that said device will normally swing by gravity into such position that said mouths will be directed downwardly and thus prevent lodgment of foreign substances therein, said connecting means being arranged to permit said device being swung upwardly so that the axes of the mouths thereof will be disposed substantially horizontally to thereby permit connection of train pipes thereto.

In testimony whereof I hereunto affix my signature.

JOSEPH ROBINSON.